UNITED STATES PATENT OFFICE.

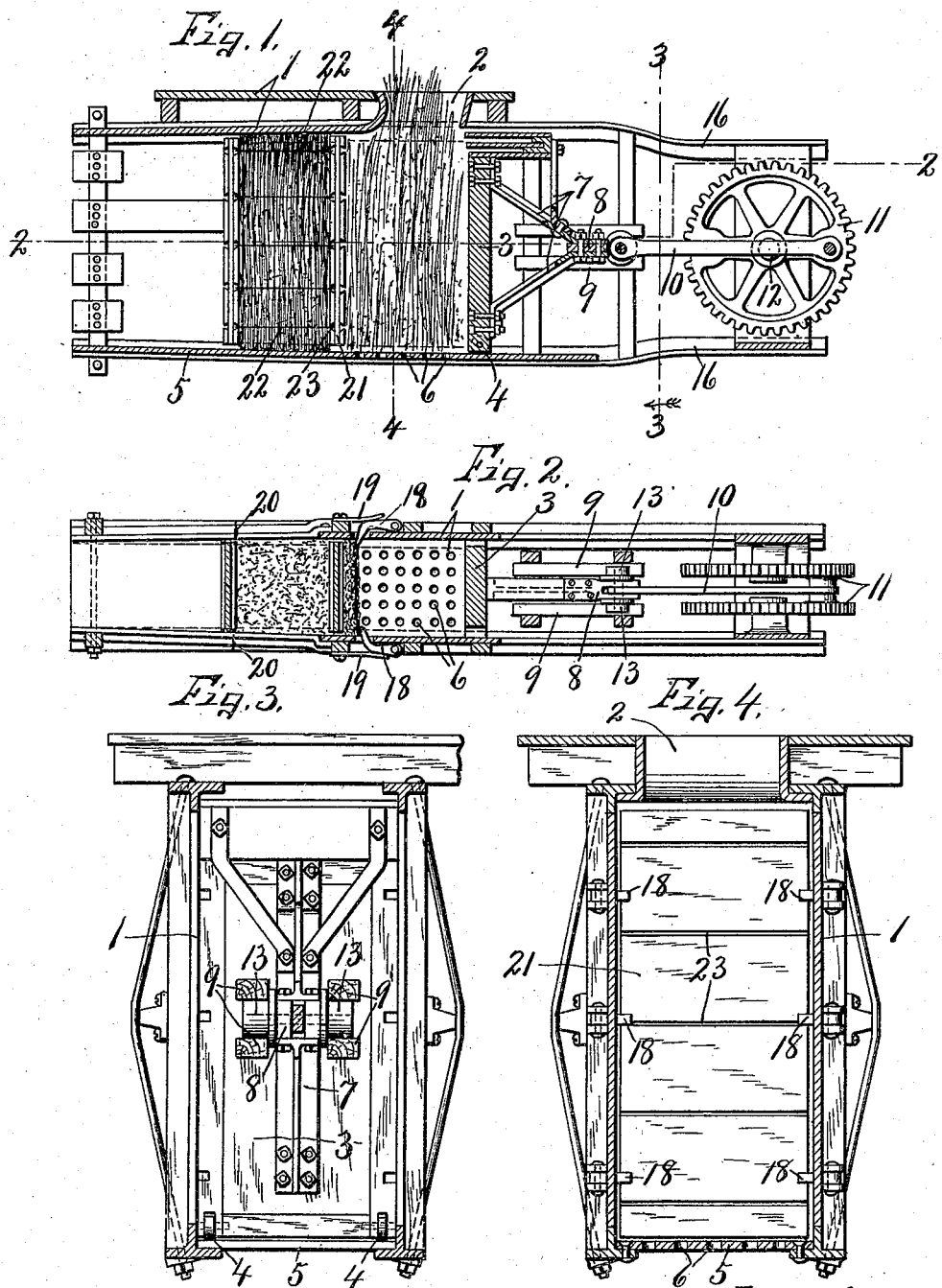

FRED A. BOTHWELL, OF EAST GENOA, NEW YORK.

BALING-PRESS.

939,466.  Specification of Letters Patent.  Patented Nov. 9, 1909.

Application filed April 25, 1908. Serial No. 429,236.

*To all whom it may concern:*

Be it known that I, FRED A. BOTHWELL, of East Genoa, in the county of Cayuga, in the State of New York, have invented new and useful Improvements in Baling-Presses, of which the following, taken in connection with the accompanying drawings, is a full, clear, and exact description.

This invention relates to certain improvements in baling presses and is particularly adapted for baling hay, straw and similar material.

My main object is to form the bales continuously and successively through the medium of a reciprocating piston acting upon the loose hay as it is fed into the press and compressing such loose hay into bale form in a tapering discharge end of the press.

Another object is to retain the compressed hay in its advanced position after each operation of the piston and to permit the insertion of suitable followers between the piston and previously compressed portion of the hay as each bale is formed.

A further object is to provide means for reciprocating the piston at regular predetermined intervals across the inlet opening for the loose hay which is forced into the press when the piston is drawn backward and is compressed in the tapering portion of the press at the opposite side of the inlet by the advance stroke of the piston.

Other objects and uses relating to specific parts of the machine will be brought out in the following description.

In the drawings—Figure 1 is a longitudinal vertical sectional view of a baling press embodying the various features of my invention. Fig. 2 is a horizontal sectional view taken on line 2—2, Fig. 1. Figs. 3 and 4 are vertical sectional views taken on lines 3—3, and 4—4, Fig. 1.

This press comprises essentially a rectangular box or frame —1— disposed in a horizontal position and open at its front and rear ends and provided with an inlet —2— in its top near the front end. This box or frame —1— is preferably of greater vertical height than the transverse width to enable the bales to be formed on end and the portion thereof at the rear of the inlet —2— tapers rearwardly thus forming a tapering discharge opening into which the hay is compressed and formed into bales which are successively discharged from the tapering outlet under the continued action of the reciprocatory piston —3—. This piston fits closely and is movable within the front end of the press box or frame —1— across the inlet opening —2— through which the loose hay is fed when the piston is at its extreme backward stroke as shown in Fig. 1, the lower edge of the piston being provided with suitable anti-friction rollers —4— which ride upon the bed or bottom —5— of the box, the portion of said bottom —5— directly under the inlet —2— being provided with apertures —6— through which the dust, chaff and other fine foreign matter may readily sift.

The piston —3— is connected by suitable forwardly extending braces —7— to a sliding cross head —8— which is guided in suitable ways —9— at the front of the press box or frame, said cross head being connected by a pitman or rod —10— to an eccentric —11—, the latter being secured upon a suitable driving shaft —12— as best seen in Fig. 1.

I preferably provide opposite sets of ways —9— located at opposite sides of the cross head —8— for receiving anti-friction rollers —13—, which carry the cross head. This cross head and connecting rod are substantially coaxial with the central axis of the press box or frame —1— as best shown in Figs. 1 and 2, the connecting rod —10— being eccentrically pivoted to and between opposite pairs of gears —14—, the latter being adapted to be connected to any available source of power, not necessary to herein illustrate or describe. These gears or eccentric driving elements —14— are mounted upon suitable forward extensions —16— of the press box frame —1— some distance in front of the guides —9— for the cross head, and therefore, a greater distance in front of the piston head —3—, the object of which is to obtain a considerable throw of the piston at each stroke.

Movable in the opposite sides of the press box or frame —1— are pivoted pawls or detents —18— which are normally pressed inwardly by suitable springs —19—, the detents being located just at the rear of the inlet —2— and preferably in planes one above the other from the top to the bottom of the box as best seen in Fig. 4. The object of these detents is to retain the compressed hay in its advanced position as compressed by each forward stroke of the piston —3—.

The rear ends of the bottom and top of the box as previously stated taper toward each other and the rear ends of the opposite sides which are usually made of open slat work are also tapered toward each other as best seen in Fig. 2 thereby producing the tapering outlet previously mentioned.

The loose hay is inserted by any suitable means through the inlet —2— in the top of the press box in front of the retracted plunger —3— and during the advance of the plunger, this loose hay is gradually compressed in the tapering end of the box at the rear of the inlet, a fresh quantity of hay being inserted at each recession of the piston and as the piston forces this loose hay rearwardly, it compresses such hay horizontally while the tapering top, bottom, and sides of the box exert a compression force upon the hay vertically tending to retard its rearward movement until a sufficient quantity has been pressed to form a bale, such quantity being determined by the position of the advance end of the compressed hay within the tapering outlet and this position is usually indicated on the box by a mark —20— or other indicating device as best seen in Fig. 2, the forward limit of the stroke of the piston —3— determining the position of the other side of the bale.

After each bale is formed in the manner just described, a suitable follower —21— is inserted between it and the plunger usually through the side of the box or the inlet opening —2— as may be desired, such follower being forced by the piston —3— against the adjacent side of the bale. As soon as this follower is placed in position behind the bale, additional loose hay is placed in the box in advance of the retracted piston —3— whereupon the loose hay as it is fed into the press box is pressed by the successive strokes of the piston —3— against the follower —21— thereby advancing the first formed bale through the tapering outlet until the advance end of the pressed hay for the second bale reaches the indicator —20— thus forming a second bale, this operation being repeated after the formation of each new bale and as these bales accumulate in the tapering end of the box they are bound by suitable tie wires —22— as best seen in Fig. 1 in which the followers are shown as provided with transverse grooves —23— through which the wires are threaded and tied horizontally around the bale at intervals from top to bottom using as many tie wires as may be necessary to secure the hay in the bale.

During the continued operation of forming the bales they are successively discharged under the pressure of the piston —3— so that the operation of forming the bales is practically continuous.

The resistance of the tapering end of the press box to the advance of the compressed hay taken in connection with the stroke of the piston and indicator as —20— is such as to determine approximately the weight as well as the size of the bale which may be compressed between the advance stroke of the piston and indicator —20— so that each bale is of practically the same size and weight.

It will be seen from the foregoing description that by forming the bale with its greatest length vertically and binding the tie wires around it horizontally, the work of binding is much easier and more expeditious and in addition to this the hay stalks are left more uniformly their natural length instead of being broken up as is usually the case when the bales are pressed endwise or horizontally, that is the stalks passing through the inlet opening in the top assume a more nearly vertical position and in this position are pressed into the bale.

What I claim is:

In a hay press, a rectangular horizontal press box open at both ends and having its top formed with an inlet for the hay, the baling chamber of said box tapering from the said inlet to the discharge end of the box, a supporting frame for the press box extending forwardly beyond the inlet end, a reciprocatory piston movable in the forward end of the box across the inlet, a sliding cross head connected to the piston, guides for said cross head secured to said frame, a revolving eccentric mounted in the forwardly-extending portion of the supporting frame, and a connecting rod between the eccentric and cross head for reciprocating the piston.

In witness whereof I have hereunto set my hand this 20th day of April 1908.

FRED A. BOTHWELL.

Witnesses:
W. J. H. PARKER,
HENRY P. FERGUSON.